United States Patent
Man et al.

(10) Patent No.: US 10,757,021 B2
(45) Date of Patent: *Aug. 25, 2020

(54) ROUTING CONTROL METHOD IN SOFTWARE DEFINED NETWORKING AND OPENFLOW CONTROLLER

(71) Applicant: Huawei Technologies Co., Ltd., Shenzhen, Guangdong (CN)

(72) Inventors: Bo Man, Chengdu (CN); Chenji Li, Hangzhou (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/273,784

(22) Filed: Feb. 12, 2019

(65) Prior Publication Data

US 2019/0182159 A1    Jun. 13, 2019

Related U.S. Application Data

(63) Continuation of application No. 15/189,828, filed on Jun. 22, 2016, now Pat. No. 10,237,181, which is a (Continued)

(30) Foreign Application Priority Data

Dec. 23, 2013  (CN) .......................... 2013 1 0719020

(51) Int. Cl.
*H04L 12/741* (2013.01)
*H04L 12/721* (2013.01)
*H04L 12/717* (2013.01)

(52) U.S. Cl.
CPC ............ *H04L 45/745* (2013.01); *H04L 45/38* (2013.01); *H04L 45/42* (2013.01)

(58) Field of Classification Search
CPC ....... H04L 45/745; H04L 45/38; H04L 45/42; H04L 45/02; H04L 45/04; H04L 45/00; H04L 49/25
See application file for complete search history.

(56) References Cited

U.S. PATENT DOCUMENTS 10,237,181 B2 *  3/2019  Man ................. H04L 45/38
2008/0267184 A1  10/2008  Arisoylu et al.
(Continued)

FOREIGN PATENT DOCUMENTS

CN    101127691 A    2/2008
CN    102685006 A    9/2012
(Continued)

OTHER PUBLICATIONS

Peter Peresini et al., "Consistent Packet Processing—Because Consistent Updates Are Not Enough," Apr. 11, 2013, 1 page.
(Continued)

*Primary Examiner* — Kibrom T Hailu
(74) *Attorney, Agent, or Firm* — Womble Bond Dickinson (US) LLP

(57) ABSTRACT

A routing control method in software defined networking and an OpenFlow controller are provided. The method includes: receiving, by an OFC, a data packet reported by an OFS; determining, by the OFC according to a key value stored in a cache, whether the data packet is a repeated packet; and if the data packet is a repeated packet, delivering, by the OFC, the data packet to the OFS, and instructing the OFS to match a stored flow table to process the data packet or transmit the data packet through a corresponding port; or if the data packet is not a repeated packet, calculating, by the OFC, a routing policy for the data packet, and delivering a flow entry to the OFS according to the routing policy. In this way, for repeated packets, the OFC may (Continued)

calculate a routing policy only once, thereby reducing a calculation amount of the OFC.

14 Claims, 6 Drawing Sheets

Related U.S. Application Data continuation of application No. PCT/CN2014/092021, filed on Nov. 24, 2014.

(56) References Cited

U.S. PATENT DOCUMENTS

| | | | |
|---|---|---|---|
| 2011/0295991 A1* | 12/2011 | Aida | H04L 12/4625 |
| | | | 709/223 |
| 2011/0317701 A1 | 12/2011 | Yamato et al. | |
| 2012/0044935 A1* | 2/2012 | Hama | H04L 12/4625 |
| | | | 370/389 |
| 2012/0185856 A1 | 7/2012 | Ashihara et al. | |
| 2012/0195187 A1 | 8/2012 | Ashihara et al. | |
| 2012/0257529 A1 | 10/2012 | Ehara et al. | |
| 2013/0042317 A1* | 2/2013 | Nakashima | H04L 49/355 |
| | | | 726/13 |
| 2013/0191530 A1 | 7/2013 | Zhang et al. | |
| 2013/0246655 A1 | 9/2013 | Itoh | |
| 2013/0308645 A1* | 11/2013 | Karino | H04L 47/10 |
| | | | 370/392 |
| 2014/0019639 A1 | 1/2014 | Ueno | |
| 2014/0328350 A1 | 11/2014 | Hao et al. | |
| 2015/0009830 A1* | 1/2015 | Bisht | H04L 47/125 |
| | | | 370/236 |
| 2015/0016477 A1* | 1/2015 | Ogawa | H04L 45/64 |
| | | | 370/503 |
| 2016/0080254 A1 | 3/2016 | Zhou et al. | |

FOREIGN PATENT DOCUMENTS

| | | |
|---|---|---|
| CN | 102946365 A | 2/2013 |
| CN | 103095701 A | 5/2013 |
| CN | 103209121 A | 7/2013 |
| CN | 103259728 A | 8/2013 |
| EP | 2975807 A1 | 1/2016 |

OTHER PUBLICATIONS

"OpenFlow Switch Specification," Version 14.0 (Wire Protocol 0x05), Open Networking Foundation, Oct. 14, 2013, 206 pages.

* cited by examiner

ROUTING CONTROL METHOD IN SOFTWARE DEFINED NETWORKING AND OPENFLOW CONTROLLER

CROSS-REFERENCE TO RELATED APPLICATIONS

This application is a continuation of U.S. patent application Ser. No. 15/189,828, filed on Jun. 22, 2016, which is a continuation of International Application No. PCT/CN2014/092021, filed on Nov. 24, 2014, which claims priority to Chinese Patent Application No. 201310719020.X, filed on Dec. 23, 2013. All of the aforementioned patent applications are hereby incorporated by reference in their entireties.

TECHNICAL FIELD

The present disclosure relates to the communications field, and more specifically, to a routing control method in software defined networking and an OpenFlow controller.

BACKGROUND

In software defined networking (SDN), a control plane is separated from a forwarding plane. The control plane defines a routing policy based on an entire network, and the forwarding plane processes a data packet according to the received routing policy. In a process in which a host initiates a request, the host requests an OpenFlow switch (OFS) to report a data packet to an OpenFlow controlled (OFCr). After completing corresponding logic, the OFC delivers flow entries to N OFSs on corresponding path in response to the request.

Two problems may occur in the process. First, in a time period from a time when the host initiates the request to a time when a corresponding flow entry takes effect in the first OFS connected to the host, M repeated requests may be reported. An OFC end processes the M repeated requests with no difference, performs calculation M times, and delivers M repeated flow entries to the N OFSs on the path. Second, in a process in which the OFC delivers flow entries to the N OFSs on the path, because a time of network transmission from the OFC to each OFS and a time when an instruction of the flow entry takes effect on each OFS are inconsistent, a problem of repeatedly reporting a data packet on different OFSs on the path still occurs after the OFC delivers the flow entry to the OFSs on the path, and the OFC still performs repeated calculation one or more times.

A current solution is that, a cache is set at an OFS end. For repeated packets in a period of time, a switch reports and processes only the first repeated packet; when an OFC delivers a flow entry, the switch then forwards corresponding same batch of data packets in the cache. This solution is applicable only to a repeated packet reported by the first OFS on a routing policy path, and is not applicable to a repeated packet reported by another OFS on the routing policy path, which still results in an increase in an amount of repeated calculation of the OFC and delivery of a large quantity of repeated flow entries.

SUMMARY

Embodiments of the present disclosure provide a routing control method in software defined networking and an OpenFlow controller, which can reduce a calculation amount of an OpenFlow controller and a delivery quantity of repeated flow entries.

According to a first aspect, a routing control method in software defined networking is provided, including: receiving, by an OpenFlow controller OFC, a data packet reported by an OpenFlow switch OFS; determining, by the OFC according to a key value stored in a cache, whether the data packet is a repeated packet, where the key value includes a data packet feature value; and if the data packet is a repeated packet, delivering, by the OFC, the data packet to the OFS, and instructing the OFS to match a stored flow table to process the data packet or instructing the OFS to transmit the data packet through a corresponding port; or if the data packet is not a repeated packet, calculating, by the OFC, a routing policy for the data packet, and delivering a flow table to the OFS according to the routing policy, so that the OFS processes the data packet according to the delivered flow table.

With reference to the first aspect, in a first implementation manner of the first aspect, the determining, by the OFC according to a key value stored in a cache, whether the data packet is a repeated packet includes: comparing, by the OFC, a feature value of the data packet with the data packet feature value in the key value, to determine whether the data packet hits the cache; and if the data packet hits the cache, determining, by the OFC, that the data packet is a repeated packet; or if the data packet misses the cache, determining, by the OFC, that the data packet is not a repeated packet.

With reference to the first aspect and the foregoing implementation manner, in a second implementation manner of the first aspect, the key value further includes a processing moment, and the determining, by the OFC according to a key value stored in a cache, whether the data packet is a repeated packet includes: comparing, by the OFC, a feature value of the data packet with the data packet feature value in the key value, to determine whether the data packet hits the cache; if the data packet hits the cache, determining, by the OFC, whether a time interval between a current moment and the processing moment in the key value is less than or equal to a preset time value, where the preset time value is a time value less than or equal to a flow table valid time; and if the time interval is less than or equal to the preset time value, determining, by the OFC, that the data packet is a repeated packet; or if the data packet misses the cache, or the time interval is greater than the preset time value, determining, by the OFC, that the data packet is not a repeated packet.

With reference to the first aspect and the foregoing implementation manners, in a third implementation manner of the first aspect, the key value further includes a processing moment and a counter value, and the determining, by the OFC according to a key value stored in a cache, whether the data packet is a repeated packet includes: comparing, by the OFC, a feature value of the data packet with the data packet feature value in the key value, to determine whether the data packet hits the cache; if the data packet hits the cache, determining, by the OFC, whether a time interval between a current moment and the processing moment in the key value is less than or equal to a preset time value, and determining whether the counter value in the key value is zero, where the preset time value is a time value less than or equal to a flow table valid time; and if the time interval is less than or equal to the preset time value, and the counter value is not zero, determining, by the OFC, that the data packet is a repeated packet, and subtracting one from the counter value in the key value; or if the data packet misses the cache, or the time interval is greater than the preset time value, or the counter value is zero, determining, by the OFC, that the data packet is not a repeated packet.

With reference to the first aspect and the foregoing implementation manners, in a fourth implementation manner of the first aspect, the preset time value is a time value determined according to a time during which the OFS responds to a message delivered by the OFC.

With reference to the first aspect and the foregoing implementation manners, in a fifth implementation manner of the first aspect, the feature value includes one or more of a source Media Access Control (MAC) address, a destination MAC address, a source Internet Protocol (IP) address, a destination IP address, a source port number, a destination port number, or a virtual local area network (VLAN) identifier and priority.

With reference to the first aspect and the foregoing implementation manners, in a sixth implementation manner of the first aspect, the cache is a cache, of a fixed size, maintained based on a least recently used LRU algorithm.

With reference to the first aspect and the foregoing implementation manners, in a seventh implementation manner of the first aspect, the determining, by the OFC according to a key value stored in a cache, whether the data packet is a repeated packet includes: allocating, by a multithreaded allocator of the OFC, a thread according to the feature value of the data packet, so that the OFC determines, in the thread according to the key value stored in the cache, whether the data packet is a repeated packet.

With reference to the first aspect and the foregoing implementation manners, in an eighth implementation manner of the first aspect, if the data packet is not a repeated packet, after the calculating, by the OFC, a routing policy for the data packet, the method further includes: storing, by the OFC, a key value of the data packet in the cache.

According to a second aspect, an OpenFlow controller is provided, including a receiving unit, a determining unit, a processing unit, and a sending unit, where the receiving unit is configured to receive a data packet reported by an OpenFlow switch OFS; the determining unit is configured to determine, according to a key value stored in a cache, whether the data packet is a repeated packet, where the key value includes a data packet feature value; and if the data packet is a repeated packet, the sending unit is configured to send the data packet to the OFS, and the processing unit is configured to instruct the OFS to match a stored flow table to process the data packet or instruct the OFS to transmit the data packet through a corresponding port; or if the data packet is not a repeated packet, the processing unit is configured to calculate a routing policy for the data packet, and the sending unit is configured to deliver a flow table to the OFS according to the routing policy, so that the OFS processes the data packet according to the delivered flow table.

With reference to the second aspect, in a first implementation manner of the second aspect, the determining unit is configured to: compare a feature value of the data packet with the data packet feature value in the key value, to determine whether the data packet hits the cache; and if the data packet hits the cache, determine that the data packet is a repeated packet; or if the data packet misses the cache, determine that the data packet is not a repeated packet.

With reference to the second aspect and the foregoing implementation manner, in a second implementation manner of the second aspect, the key value further includes a processing moment, and the determining unit is configured to: compare a feature value of the data packet with the data packet feature value in the key value, to determine whether the data packet hits the cache; if the data packet hits the cache, determine whether a time interval between a current moment and the processing moment in the key value is less than or equal to a preset time value, where the preset time value is a time value less than or equal to a flow table valid time; and if the time interval is less than or equal to the preset time value, determine that the data packet is a repeated packet; or if the data packet misses the cache, or the time interval is greater than the preset time value, determine that the data packet is not a repeated packet.

With reference to the second aspect and the foregoing implementation manners, in a third implementation manner of the second aspect, the key value further includes a processing moment and a counter value, and the determining unit is configured to: compare a feature value of the data packet with the data packet feature value in the key value, to determine whether the data packet hits the cache; if the data packet hits the cache, determine whether a time interval between a current moment and the processing moment in the key value is less than or equal to a preset time value, and determine whether the counter value in the key value is zero, where the preset time value is a time value less than or equal to a flow table valid time; and if the time interval is less than or equal to the preset time value, and the counter value is not zero, determine that the data packet is a repeated packet, and subtract one from the counter value in the key value; or if the data packet misses the cache, or the time interval is greater than the preset time value, or the counter value is zero, determine that the data packet is not a repeated packet.

With reference to the second aspect and the foregoing implementation manners, in a fourth implementation manner of the second aspect, the preset time value is a time value determined according to a time during which the OFS responds to a message delivered by the OpenFlow controller.

With reference to the second aspect and the foregoing implementation manners, in a fifth implementation manner of the second aspect, the feature value includes one or more of a source Media Access Control MAC address, a destination MAC address, a source Internet Protocol IP address, a destination IP address, a source port number, a destination port number, or a virtual local area network VLAN identifier and priority.

With reference to the second aspect and the foregoing implementation manners, in a sixth implementation manner of the second aspect, the cache is a cache, of a fixed size, maintained based on a least recently used (LRU) algorithm.

With reference to the second aspect and the foregoing implementation manners, in a seventh implementation manner of the second aspect, the OpenFlow controller further includes an allocation unit, configured to allocate a thread according to the feature value of the data packet, where the determining unit is configured to determine, in the thread according to the key value stored in the cache, whether the data packet is a repeated packet.

With reference to the second aspect and the foregoing implementation manners, in an eighth implementation manner of the second aspect, the OpenFlow controller further includes a storage unit, configured to: if the data packet is not a repeated packet, store a key value of the data packet in the cache after the OpenFlow controller calculates the routing policy for the data packet.

Based on the foregoing technical solutions, in the method according to the embodiments of the present disclosure, an OFC may determine, according to a key value stored in a cache, whether a reported data packet is a repeated packet; and if the data packet is a repeated packet, the OFC directly delivers the data packet to an OFS, and instructs the OFS to match a stored flow table to process the data packet. In this way, for repeated data packets reported by the first or another OFS on a transmission path, the OFC may calculate a routing policy only once, thereby reducing a calculation amount of the OFC. Moreover, a quantity of repeated flow entries delivered by the OFC is reduced, thereby relieving bandwidth pressure at an OFC egress.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
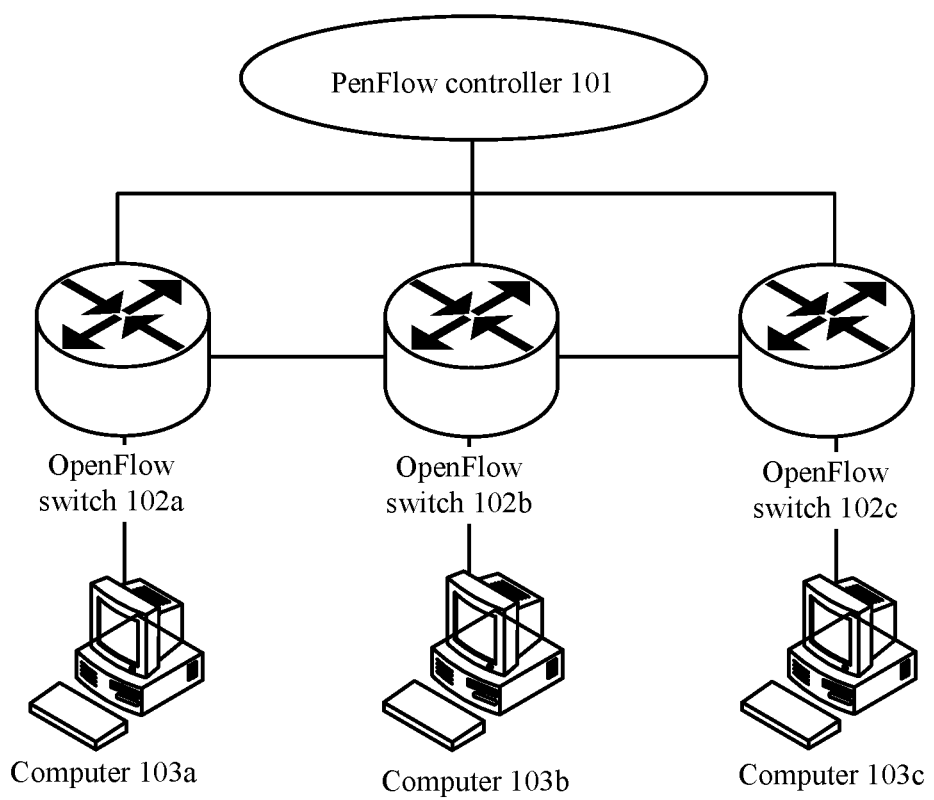
FIG. 1 is a schematic structural diagram of an applicable communications system according to an embodiment of the present disclosure.

FIG. 1 is a schematic structural diagram of an applicable communications system according to an embodiment of the present disclosure. The communications system of FIG. 1 includes an OpenFlow controller OFC 101, OpenFlow switches OFSs (102a, 102b, and 102c), and computers (103a, 103b, and 103c). In the communications system, the computers (103a, 103b, and 103c) are connected to a network by using the OpenFlow switches OFSs (102a, 102b, and 102c), and the OpenFlow switches OFSs (102a, 102b, and 102c) are connected to the OpenFlow controller OFC 101. The OpenFlow controller OFC 101 defines a routing policy based on an entire network topology, and the OpenFlow switches OFSs (102a, 102b, and 102c) process, according to the received routing policy, data packets received from the computers (103a, 103b, and 103c). Quantities of the computers and the OFSs in the communications system are not limited in this embodiment of the present disclosure.

It is assumed that the computer 103a acts as a host to initiate a data transmission request, and requests to transmit a data packet to the computer 103c. The data packet is reported to the OFC 101 by the OFS 102a. After calculating a routing policy for the data packet, the OFC 101 generates flow entries of N OFSs on corresponding path, and delivers the flow entries to the N OFSs on the path. However, in this process, the computer 103a may have M repeated requests (for example, all for requesting to transmit the data packet to the computer 103c) to be reported to the OFS 102a. In this case, the OFC 101 repeatedly calculates the routing policy M times, and a calculation amount is relatively large.

For same data transmission requests in a short time, if the same data transmission requests miss a real flow entry and a simulated false flow entry, a false flow entry may be set at an OFS 102a end. The first data packet is reported to the OFC 101, and a false flow entry is generated at the same time. In a time period in which a flow entry delivered by the OFC 101 does not come into effect on the OFS 102a, the subsequent M−1 same transmission requests hit the false flow entry and enter a cache, and may not be reported to the OFC 101. After a flow entry delivered by the OFC 101 for the same requests takes effect, the OFS 102a processes data in the cache according to the flow entry that takes effect. In this way, for the M same requests of the computer 103a, the OFC 101 calculates a routing policy only once instead of calculating M times, thereby reducing a calculation amount.

However, because a time of network transmission from an OFC to each OFS and a time when an instruction of the flow entry comes to effect on each OFS are inconsistent, an OFS on a transmission path may further report a data packet to request a routing policy. In this case, the OFC 101 further repeatedly calculates the routing policy. In addition, if the OFS processes a repeated packet, complexity that the OFS processes the data packet increases, which is against a design idea of an SDN network to some extent and is not beneficial to implement standardization of the OFS. In addition, after a cache of the OFS runs up, full-packet report is performed according to the OpenFlow protocol, and the foregoing processing mechanism may become invalid, which still results in an increase in an amount of repeated calculation of the OFC and delivery of a large quantity of repeated flow entries.

In this embodiment of the present disclosure, a cache is set on the OFC 101, and a key value of a corresponding data packet is stored after a routing policy is calculated. In this way, the OFC 101 may determine, according to the key value stored in the cache, whether a reported data packet is a repeated packet. If the data packet is a repeated packet, the data packet is directly delivered to an OFS, and the OFS is instructed to match a flow table to perform transmission. In this way, for repeated data packets reported by the first or another OFS on a transmission path, the OFC may calculate a routing policy only once, so as to reduce a calculation amount of the OFC. Moreover, a quantity of repeated flow entries delivered by the OFC is reduced, so as to relieve bandwidth pressure at an OFC egress.

Figure 2:
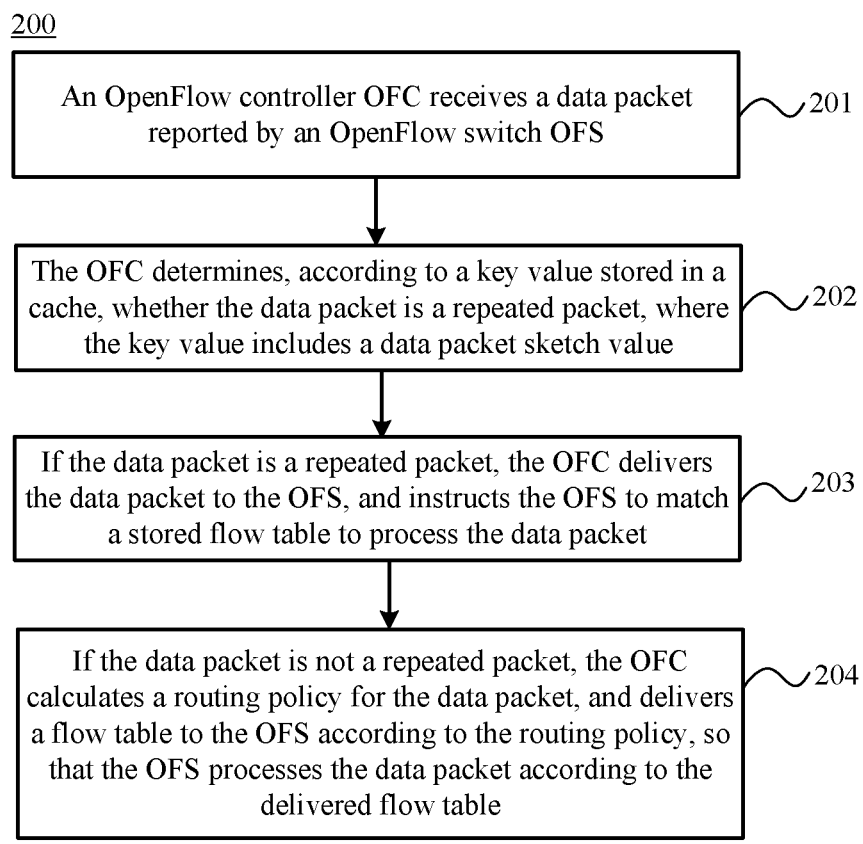
FIG. 2 is a schematic flowchart of a routing control method in software defined networking according to an embodiment of the present disclosure.

FIG. 2 is a schematic flowchart of a routing control method in software defined networking according to an embodiment of the present disclosure. The method 200 in FIG. 2 may be executed by an OFC, for example, the OFC 101 shown in FIG. 1.

201. An OpenFlow controller OFC receives a data packet reported by an OpenFlow switch OFS.

202. The OFC determines, according to a key value stored in a cache, whether the data packet is a repeated packet, where the key value includes a data packet feature value.

203. If the data packet is a repeated packet, the OFC delivers the data packet to the OFS, and instructs the OFS to match a stored flow table to process the data packet or instructs the OFS to transmit the data packet through a corresponding port.

For example, after determining that the data packet is a repeated packet, the OFC directly delivers the data packet to the OFS, and instructs the OFS to match the stored flow table to process the data packet. The OFS may first change, according to the instruction of the OFC, header information of the data packet according to the matched flow table, and then transmit the data packet through a port indicated in the flow table, or may directly transmit the data packet through a port indicated in the flow table; if there is no need to perform processing on header information of the data packet, the OFC directly instructs the OFS to transmit the data packet through the corresponding port.

204. If the data packet is not a repeated packet, the OFC calculates a routing policy for the data packet, and delivers a flow table to the OFS according to the routing policy, so that the OFS processes the data packet according to the delivered flow table.

Based on the foregoing technical solution, in the method according to this embodiment of the present disclosure, an OFC may determine, according to a key value stored in a cache, whether a reported data packet is a repeated packet; and if the data packet is a repeated packet, the OFC directly delivers the data packet to an OFS, and instructs the OFS to match a stored flow table to process the data packet. In this way, for repeated data packets reported by the first or another OFS on a transmission path, the OFC may calculate a routing policy only once, thereby reducing a calculation amount of the OFC. Moreover, a quantity of repeated flow entries delivered by the OFC is reduced, thereby relieving bandwidth pressure at an OFC egress.

In addition, the OFC recognizes and processes the repeated packet, and an OFS end does not need to change processing logic for the data packet. This meets a design idea of an SDN network, in which an OFC is responsible for defining a routing policy on a control plane and an OFS implements data forwarding on a forwarding plane, and also helps implement standardization of the SDN network.

It should be understood that, the key value is information, about the data packet, stored when the OFC calculates the routing policy. For example, the information about the data packet may include a feature value and a supplementary value of the data packet. The feature value is information indicating a transmission source and a destination of the data packet that distinguishes the data packet from another data packet. The supplementary value is some other information for processing the data packet, for example, a moment for processing the data packet or an initial counter value that is set for the data packet. A 12-tuple (for example, a 12-tuple specified in the OpenFlow protocol) in a header of the data packet may be extracted, a tuple corresponding to an ingress port is removed, and the remaining 11-tuple is encapsulated as the feature value. Further, other necessary information such as a processing moment for processing the data packet, a preset time value corresponding to the data packet, an identifier of a thread for processing the data packet, and an initial counter value may be used as the supplementary value.

It should be further understood that, the repeated packet refers to a data packet for which a routing policy does not need to be calculated again, which is determined according to processing logic of the OFC.

Optionally, as an embodiment, when the OFC determines, according to the key value stored in the cache, whether the data packet is a repeated packet in step 202, the OFC may compare a feature value of the data packet with the data packet feature value in the key value, to determine whether the data packet hits the cache. If the data packet hits the cache, the OFC determines that the data packet is a repeated packet. If the data packet misses the cache, the OFC determines that the data packet is not a repeated packet.

For example, if the data packet hits the cache, the OFC determines that the data packet is a repeated packet, and then according to a processing procedure of a repeated packet, directly delivers the data packet to the OFS and instructs the OFS to match a stored flow table to process the data packet. If the data packet misses the cache, the OFC may consider that the data packet is not a repeated packet. In this case, the OFC may process the data packet according to a normal procedure: calculating a routing policy for the data packet and then delivering a flow entry to the OFS on a path, so that the OFS processes the data packet according to the delivered flow entry; and the OFC stores a key value of the data packet.

Optionally, as another embodiment, the key value further includes a processing moment, and when the OFC determines, according to the key value stored in the cache, whether the data packet is a repeated packet in step 202, the OFC may compare a feature value of the data packet with the data packet feature value in the key value, to determine whether the data packet hits the cache. If the data packet hits the cache, the OFC determines whether a time interval between a current moment and the processing moment in the key value is less than or equal to a preset time value, where the preset time value is a time value less than or equal to a flow table valid time. If the time interval is less than or equal to the preset time value, the OFC determines that the data packet is a repeated packet. If the data packet misses the cache, or the time interval is greater than the preset time value, the OFC determines that the data packet is not a repeated packet.

For example, if that the data packet hits the cache and that the time interval is less than or equal to the preset time value are not satisfied at the same time, the OFC may determine that the data packet is not a repeated packet, process the data packet according to a normal procedure, and store a key value of the data packet in the cache.

In this way, a network error caused by setting no time limit or setting a large time value can be prevented, and performance of the SDN network can be further improved.

For example, if a time of idle time out set by the OFC for a flow entry is 5 s, the preset time value should be less than 5 s. Generally, a time of hard time out of a flow entry is greater than a time of idle time out, and if the time of hard time out of the flow table is not greater than the time of idle time out, the preset time value should be less than a smaller numerical value of the two.

Optionally, as another embodiment, the key value further includes a processing moment and a counter value, and when the OFC determines, according to the key value stored in the cache, whether the data packet is a repeated packet in step 202, the OFC compares a feature value of the data packet with the data packet feature value in the key value, to determine whether the data packet hits the cache. If the data packet hits the cache, the OFC determines whether a time interval between a current moment and the processing moment in the key value is less than or equal to a preset time value, and determines whether the counter value in the key value is zero, where the preset time value is a time value less than or equal to a flow table valid time. If the time interval is less than or equal to the preset time value, and the counter value is not zero, the OFC determines that the data packet is a repeated packet, and subtracts one from the counter value in the key value. If the data packet misses the cache, or the time interval is greater than the preset time value, or the counter value is zero, the OFC determines that the data packet is not a repeated packet.

An initial value is preset for a counter, and after the OFC determines that the data packet is a repeated packet, one is subtracted from the counter value. If that the data packet hits the cache, that the time interval is less than or equal to the preset time value, and that the counter value is not zero are not satisfied at the same time, the OFC may determine that the data packet is not a repeated packet, process the data packet according to a normal procedure, and store a key value of the data packet in the cache. If the counter value is zero, the counter is reset to the initial value.

In this way, a network error caused by setting no time limit or setting a large time value can be prevented, and performance of the SDN network can be further improved. For example, in a process in which the OFC delivers a flow entry to the OFS, an accidental error, a communication error, a check error, a validation error, or the like occurs, and consequently, the flow entry does not take effect.

In addition, when a network error occurs, the OFC may constantly determine that a data packet is a repeated packet, and instruct the OFS to match a flow entry to perform transmission. However, the OFS cannot find a matched flow entry all the time, and reports the data packet to the OFC, causing a transmission storm. A counter constraint condition is added, and according to the foregoing processing procedure, when a quantity of times that the OFC constantly delivers a data packet exceeds the initial counter value, the OFC recalculates a routing policy, so as to avoid or ease the foregoing transmission storm.

Optionally, as another embodiment, the cache is a cache, of a fixed size, maintained based on a least recently used LRU algorithm. In this way, when a cache capacity is insufficient, a least recently used key value can be automatically deleted, so as to implement self-management.

Optionally, as another embodiment, when the OFC determines, according to the key value stored in the cache, whether the data packet is a repeated packet in step 202, a multithreaded allocator of the OFC may allocate a thread according to the feature value of the data packet, so that the OFC determines, in the thread according to the key value stored in the cache, whether the data packet is a repeated packet.

In this way, the OFC may roughly allocate, according to the feature value of the data packet, data packets that may hit the cache to a same thread for processing, so as to avoid a problem that different threads process similar data packets but cannot recognize a repeated packet, thereby further improving processing efficiency of a repeated packet and reducing a calculation amount of the OFC.

Figure 3:
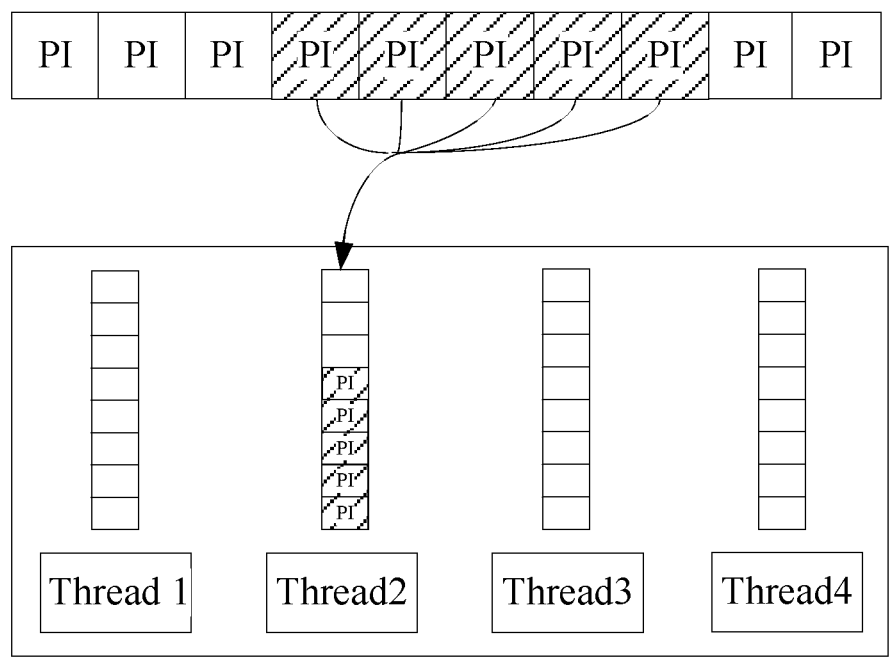
FIG. 3 is a schematic flowchart of multithreaded processing of an OpenFlow controller according to an embodiment of the present disclosure.

As shown in FIG. 3, FIG. 3 is a schematic flowchart of multithreaded processing of an OpenFlow controller according to an embodiment of the present disclosure. Shaded PI (Packet in) packets reported to the OFC are similar data packets. A cache of the OFC stores an identifier of a thread for processing a PI packet, and a multithreaded allocator allocates, according to the stored thread identifier, these similar data packets to a same thread for processing.

Optionally, as another embodiment, the feature value includes one or more of a source Media Access Control MAC address, a destination MAC address, a source Internet Protocol IP address, a destination IP address, a source port number, a destination port number, or a virtual local area network VLAN identifier and priority.

Optionally, as another embodiment, the preset time value is a time value determined according to a time during which the OFS responds to a message delivered by the OFC.

For example, the preset time value may be determined by referring to a time interval of a protocol messages exchange between the OFC and the OFS or a time interval between a time when the OFC delivers a flow entry to the OFS and a time when the OFC receives a return message of the OFS indicating that the flow entry is successfully generated. This interval may be obtained through averaging or by using a last value.

Optionally, as another embodiment, if the data packet is not a repeated packet, after the OFC calculates the routing policy for the data packet, the OFC stores a key value of the data packet in the cache.

Optionally, if a network is unstable, the OFC may further perform the following processing: clearing all data in the cache when a network topology flaps, that is, when a link is changed; or, deleting a cache object related to a host when a mount point of the host is deleted or changed.

The following describes the embodiments of the present disclosure in detail with reference to specific examples. It should be noted that, these examples are only intended for enabling a person skilled in the art to better understand the embodiments of the present disclosure, other than limiting the scope of the embodiments of the present disclosure.

Figure 4:
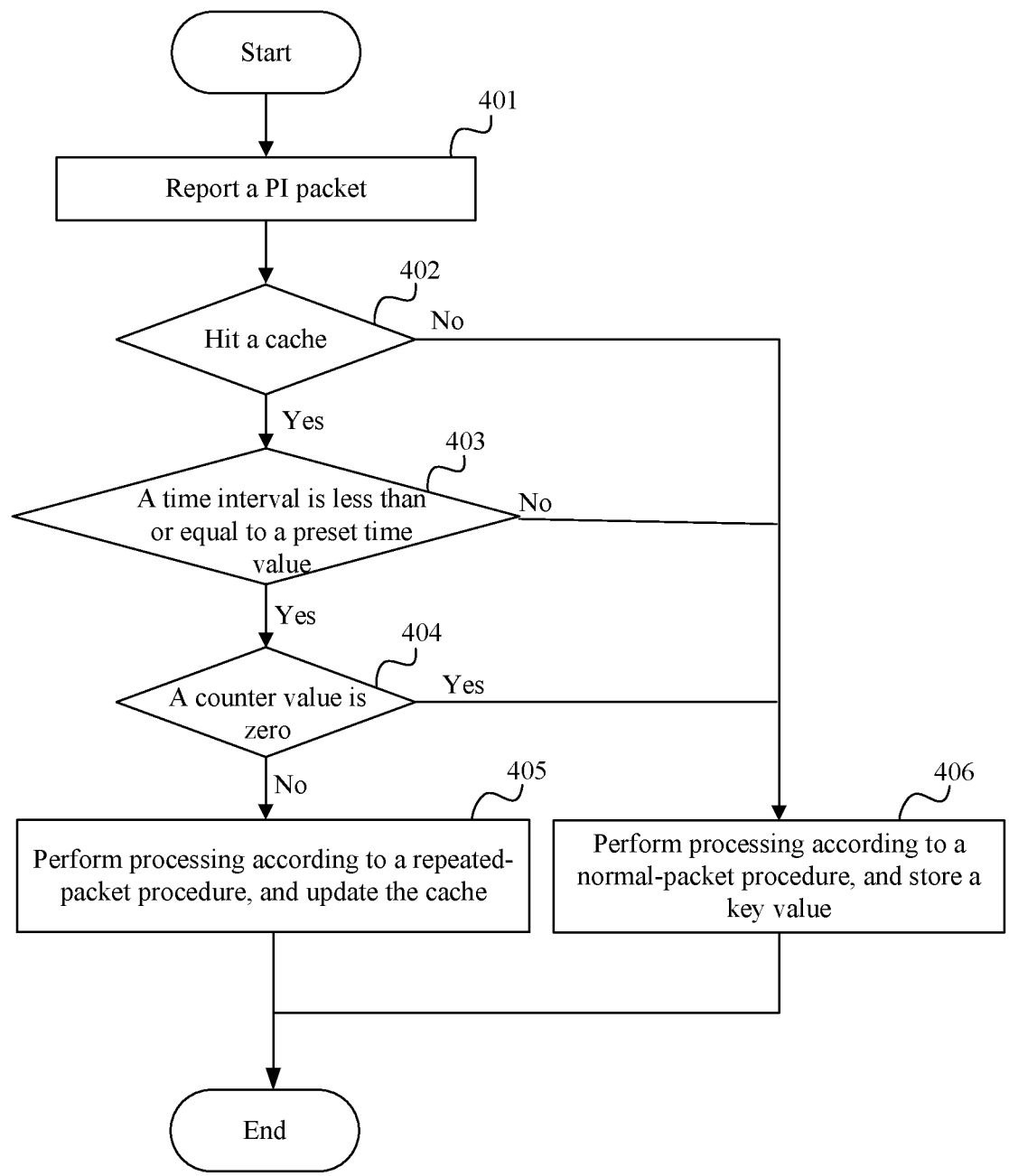
FIG. 4 is a schematic flowchart of a routing control method in software defined networking according to another embodiment of the present disclosure.

FIG. 4 is a schematic flowchart of a routing control method in software defined networking according to another embodiment of the present disclosure.

401. An OFS reports a PI packet to an OFC.

402. The OFC determines, according to a key value stored in a cache, whether the PI packet hits the cache. The OFC may compare a feature value of the PI packet with a feature value in the key value, to determine whether the PI packet hits the cache. If the PI packet hits the cache, go to step 403; if the PI packet misses the cache, go to step 406.

403. The OFC determines whether a time interval between a current moment and a processing moment in the key value is less than or equal to a preset time value. If the time interval is less than or equal to the preset time value, go to step 404; if the PI packet misses the cache, go to step 406.

404. The OFC determines whether a counter value in the key value is zero. If the counter value is zero, reset a counter to an initial value, and go to step 406; if the counter value is not zero, go to step 405.

405. Process the PI packet according to a processing procedure of a repeated packet, and update the cache. The OFC directly delivers the PI packet to the OFS, instructs the OFS to match an existing flow table to perform transmission or instructs the OFS to transmit the data packet through a corresponding port, and updates the cache, that is, subtracts one from the counter value.

406. Process the PI packet according to a normal procedure, and store a key value. The OFC calculates a routing policy for the PI packet, and then delivers a flow entry to the OFS on a path, so that the OFS transmits the data packet according to the delivered flow entry. Moreover, a 12-tuple of a header of the PI packet is extracted, and a key value of the data packet is stored.

In the method according to this embodiment of the present disclosure, an OFC may determine, according to a key value stored in a cache, whether a reported data packet is a repeated packet; and if the data packet is a repeated packet, the OFC directly delivers the data packet to an OFS, and instructs the OFS to match a stored flow table to process the data packet. In this way, for repeated data packets reported by the first or another OFS on a transmission path, the OFC may calculate a routing policy only once, thereby reducing a calculation amount of the OFC. Moreover, a quantity of repeated flow entries delivered by the OFC is reduced, thereby relieving bandwidth pressure at an OFC egress.

Figure 5:
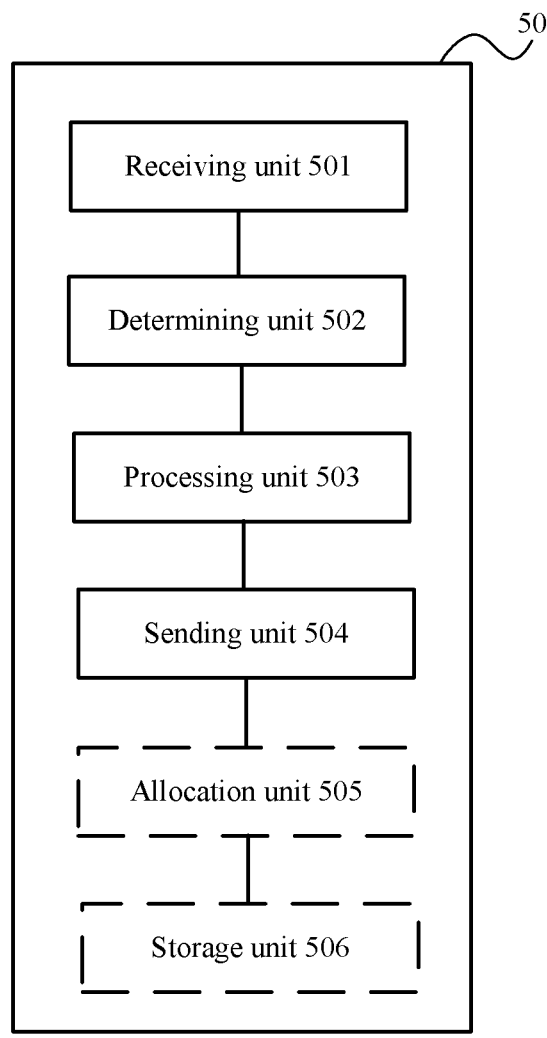
FIG. 5 is a schematic block diagram of an OpenFlow controller according to an embodiment of the present disclosure.

FIG. 5 is a schematic block diagram of an OpenFlow controller 50 according to an embodiment of the present disclosure. The OpenFlow controller 50 in FIG. 5 includes a receiving unit 501, a determining unit 502, a processing unit 503, and a sending unit 504.

The receiving unit 501 is configured to receive a data packet reported by an OpenFlow switch OFS.

The determining unit 502 is configured to determine, according to a key value stored in a cache, whether the data packet is a repeated packet, where the key value includes a data packet feature value.

If the data packet is a repeated packet, the sending unit 504 is configured to send the data packet to the OFS, and the processing unit 503 is configured to instruct the OFS to match a stored flow table to process the data packet or instruct the OFS to transmit the data packet through a corresponding port.

If the data packet is not a repeated packet, the processing unit 503 is configured to calculate a routing policy for the data packet, and the sending unit 504 is configured to deliver a flow table to the OFS according to the routing policy, so that the OFS processes the data packet according to the delivered flow table.

Based on the foregoing technical solution, an OFC in this embodiment of the present disclosure may determine, according to a key value stored in a cache, whether a reported data packet is a repeated packet; and if the data packet is a repeated packet, the OFC directly delivers the data packet to an OFS, and instructs the OFS to match a stored flow table to process the data packet. In this way, for repeated data packets reported by the first or another OFS on a transmission path, the OFC may calculate a routing policy only once, thereby reducing a calculation amount of the OFC. Moreover, a quantity of repeated flow entries delivered by the OFC is reduced, thereby relieving bandwidth pressure at an OFC egress.

In addition, the OFC recognizes and processes the repeated packet, and an OFS end does not need to change processing logic for the data packet. This meets a design idea of an SDN network, in which an OFC is responsible for defining a routing policy on a control plane and an OFS implements data forwarding on a forwarding plane, and also helps implement standardization of the SDN network.

It should be understood that, the key value is information, about the data packet, stored when the OFC calculates the routing policy. For example, the information about the data packet may include a feature value and a supplementary value of the data packet. The feature value is information indicating a transmission source and a destination of the data packet that distinguishes the data packet from another data packet. The supplementary value is some other information for processing the data packet, for example, a moment for processing the data packet or an initial counter value that is set for the data packet. A 12-tuple (for example, a 12-tuple specified in the OpenFlow protocol) in a header of the data packet may be extracted, a tuple corresponding to an ingress port is removed, and the remaining 11-tuple is encapsulated as the feature value. Further, other necessary information such as a processing moment for processing the data packet, a preset time value corresponding to the data packet, an identifier of a thread for processing the data packet, and an initial counter value may be used as the supplementary value.

It should be further understood that, the repeated packet refers to a data packet for which a routing policy does not need to be calculated again, which is determined according to processing logic of the OFC.

Optionally, as an embodiment, the determining unit 502 is configured to: compare a feature value of the data packet with the data packet feature value in the key value, to determine whether the data packet hits the cache; and if the data packet hits the cache, determine that the data packet is a repeated packet; or if the data packet misses the cache, determine that the data packet is not a repeated packet.

For example, if the data packet hits the cache, the OFC determines that the data packet is a repeated packet, and then according to a processing procedure of a repeated packet, directly delivers the data packet to the OFS and instructs the OFS to match an existing flow table to perform transmission. If the data packet misses the cache, the OFC may consider that the data packet is not a repeated packet. In this case, the OFC may process the data packet according to a normal procedure: calculating a routing policy for the data packet and then delivering a flow entry to the OFS on a path, so that the OFS transmits the data packet according to the delivered flow entry; and the OFC stores a key value of the data packet.

Optionally, as another embodiment, the key value further includes a processing moment. The determining unit 502 is configured to: compare a feature value of the data packet with the data packet feature value in the key value, to determine whether the data packet hits the cache; if the data packet hits the cache, determine whether a time interval between a current moment and the processing moment in the key value is less than or equal to a preset time value, where the preset time value is a time value less than or equal to a flow table valid time; and if the time interval is less than or equal to the preset time value, determine that the data packet is a repeated packet; or if the data packet misses the cache, or the time interval is greater than the preset time value, determine that the data packet is not a repeated packet.

For example, if that the data packet hits the cache and that the time interval is less than or equal to the preset time value are not satisfied at the same time, the OFC may determine that the data packet is not a repeated packet, process the data packet according to a normal procedure, and store a key value of the data packet in the cache.

In this way, a network error caused by setting no time limit or setting a large time value can be prevented, and performance of the SDN network can be further improved.

For example, if a time of idle time out set by the OFC for a flow entry is 5 s, the preset time value should be less than 5 s. Generally, a time of hard time out of a flow entry is far greater than a time of idle time out, and if the time of hard time out of the flow table is not far greater than the time of idle time out, the preset time value should be less than a smaller numerical value of the two.

Optionally, as another embodiment, the key value further includes a processing moment and a counter value. The determining unit 502 is configured to: compare a feature value of the data packet with the data packet feature value in the key value, to determine whether the data packet hits the cache; if the data packet hits the cache, determine whether a time interval between a current moment and the processing moment in the key value is less than or equal to a preset time value, and determine whether the counter value in the key value is zero, where the preset time value is a time value less than or equal to a flow table valid time; and if the time interval is less than or equal to the preset time value, and the counter value is not zero, determine that the data packet is a repeated packet, and subtract one from the counter value in the key value; or if the data packet misses the cache, or the time interval is greater than the preset time value, or the counter value is zero, determine that the data packet is not a repeated packet.

An initial value is preset for a counter, and after the OFC determines that the data packet is a repeated packet, one is subtracted from the counter value. If that the data packet hits the cache, that the time interval is less than or equal to the preset time value, and that the counter value is not zero are not satisfied at the same time, the OFC may determine that the data packet is not a repeated packet, process the data packet according to a normal procedure, and store a key value of the data packet in the cache. If the counter value is zero, the counter is reset to the initial value.

In this way, a network error caused by setting no time limit or setting a large time value can be prevented, and performance of the SDN network can be further improved. For example, in a process in which the OFC delivers a flow entry to the OFS, an accidental error, a communication error, a check error, a validation error, or the like occurs, and consequently, the flow entry does not take effect.

In addition, when a network error occurs, the OFC may constantly determine that a data packet is a repeated packet, and instruct the OFS to match a flow entry to perform transmission. However, the OFS cannot find a matched flow entry all the time, and reports the data packet to the OFC, causing a transmission storm. A counter constraint condition is added, and according to the foregoing processing procedure, when a quantity of times that the OFC constantly delivers a data packet exceeds the initial counter value, the OFC recalculates a routing policy, so as to avoid or ease the foregoing transmission storm.

Optionally, as another embodiment, the cache is a cache, of a fixed size, maintained based on a least recently used LRU algorithm. In this way, when a cache capacity is insufficient, a least recently used key value can be automatically deleted, so as to implement self-management.

Optionally, as another embodiment, the OpenFlow controller 50 may further include an allocation unit 505, configured to allocate a thread according to the feature value of the data packet. In this case, the determining unit 502 is configured to determine, in the thread according to the key value stored in the cache, whether the data packet is a repeated packet.

In this way, the OFC may roughly allocate, according to the feature value of the data packet, data packets that may hit the cache to a same thread for processing, so as to avoid a problem that different threads process similar data packets but cannot recognize a repeated packet, thereby further improving processing efficiency of a repeated packet and reducing a calculation amount of the OFC.

Optionally, as another embodiment, the feature value includes one or more of a source Media Access Control MAC address, a destination MAC address, a source Internet Protocol IP address, a destination IP address, a source port number, a destination port number, or a virtual local area network VLAN identifier and priority.

Optionally, as another embodiment, the preset time value is a time value determined according to a time during which the OFS responds to a message delivered by the OpenFlow controller.

For example, the preset time value may be determined by referring to a time interval of a protocol messages exchange between the OFC and the OFS or a time interval between a time when the OFC delivers a flow entry to the OFS and a time when the OFC receives a return message of the OFS indicating that the flow entry is successfully generated. This interval may be obtained through averaging or by using a last value.

Optionally, as another embodiment, the OpenFlow controller 50 further includes a storage unit 506, configured to: if the data packet is not a repeated packet, store a key value of the data packet in the cache after the OpenFlow controller calculates the routing policy for the data packet.

Optionally, if a network is unstable, the OpenFlow controller 50 may further perform the following processing: clearing all data in the cache when a network topology flaps, that is, when a link is changed; or, deleting a cache object related to a host when a mount point of the host is deleted or changed.

Figure 6:
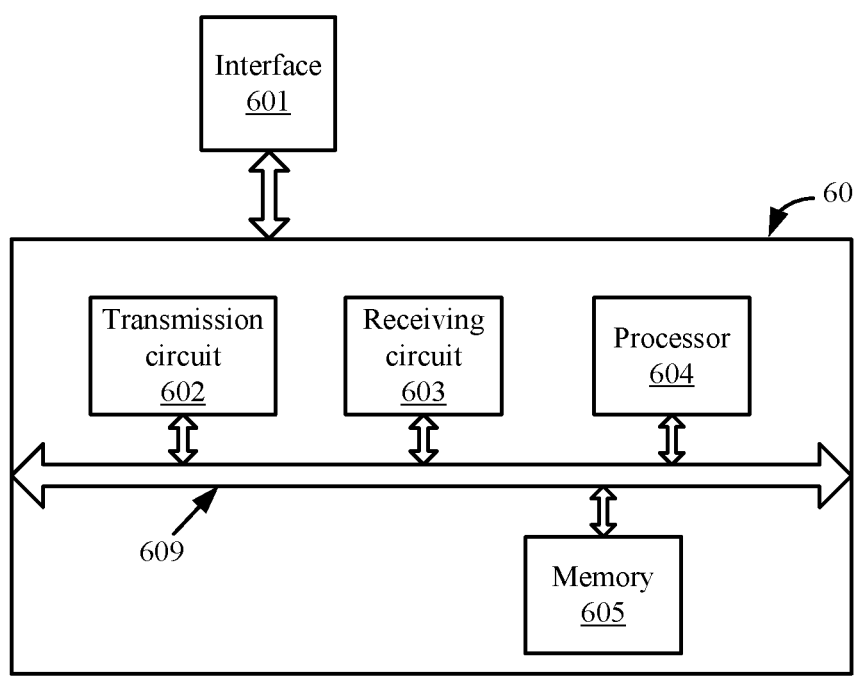
FIG. 6 is a schematic block diagram of an OpenFlow controller according to another embodiment of the present disclosure.

FIG. 6 is a schematic block diagram of an OpenFlow controller 60 according to another embodiment of the present disclosure.

The OpenFlow controller 60 in FIG. 6 may be configured to implement the steps and methods in the foregoing method embodiments. In the embodiment of FIG. 6, the OpenFlow controller 60 includes a transmission circuit 602, a receiving circuit 603, a processor 604, a memory 605, and an interface 601. The processor 604 controls an operation of the OpenFlow controller 60, and may be configured to process a signal. The processor 604 may also be referred to as a central processing unit (CPU). The memory 605 may include a read-only memory and a random access memory, and provides an instruction and data for the processor 604. A part of the memory 605 may further include a non-volatile random access memory (NVRAM). In a specific application, the OpenFlow controller 60 may be imbedded in or be a wireless communications device, for example, a mobile phone. The transmission circuit 602 and the receiving circuit 603 may be coupled to the interface 601. Components of the OpenFlow controller 60 are coupled together by using a bus system 609, where in addition to a data bus, the bus system 609 may further include a power bus, a control bus, and a state signal bus. However, for clear description, various buses in the figure are marked as the bus system 609.

The memory 605 may store an instruction that enables the processor 604 to execute the following operations:

receiving a data packet reported by an OpenFlow switch OFS; determining, according to a key value stored in a cache, whether the data packet is a repeated packet, where the key value includes a data packet feature value; and if the data packet is a repeated packet, delivering the data packet to the OFS, and instructing the OFS to match a stored flow table to process the data packet; or if the data packet is not a repeated packet, calculating a routing policy for the data packet, and delivering a flow table to the OFS according to the routing policy, so that the OFS processes the data packet according to the delivered flow table.

Based on the foregoing technical solution, in this embodiment of the present disclosure, an OFC may determine, according to a key value stored in a cache, whether a reported data packet is a repeated packet; and if the data packet is a repeated packet, the OFC directly delivers the data packet to an OFS, and instructs the OFS to match a stored flow table to process the data packet. In this way, for repeated data packets reported by the first or another OFS on a transmission path, the OFC may calculate a routing policy only once, thereby reducing a calculation amount of the OFC. Moreover, a quantity of repeated flow entries delivered by the OFC is reduced, thereby relieving bandwidth pressure at an OFC egress.

In addition, the OFC recognizes and processes the repeated packet, and an OFS end does not need to change processing logic for the data packet. This meets a design idea of an SDN network, in which an OFC is responsible for defining a routing policy on a control plane and an OFS implements data forwarding on a forwarding plane, and also helps implement standardization of the SDN network.

It should be understood that, the key value is information, about the data packet, stored when the OFC calculates the routing policy. For example, the information about the data packet may include a feature value and a supplementary value of the data packet. The feature value is information indicating a transmission source and a destination of the data packet that distinguishes the data packet from another data packet. The supplementary value is some other information for processing the data packet, for example, a moment for processing the data packet or an initial counter value that is set for the data packet. A 12-tuple (for example, a 12-tuple specified in the OpenFlow protocol) in a header of the data packet may be extracted, a tuple corresponding to an ingress port is removed, and the remaining 11-tuple is encapsulated as the feature value. Further, other necessary information such as a processing moment for processing the data packet, a preset time value corresponding to the data packet, an identifier of a thread for processing the data packet, and an initial counter value may be used as the supplementary value.

It should be further understood that, the repeated packet refers to a data packet for which a routing policy does not need to be calculated again, which is determined according to processing logic of the OFC.

Optionally, as an embodiment, the memory 605 may further store an instruction that enables the processor 604 to execute the following operations:

comparing a feature value of the data packet with the data packet feature value in the key value, to determine whether the data packet hits the cache; and if the data packet hits the cache, determining that the data packet is a repeated packet; or if the data packet misses the cache, determining that the data packet is not a repeated packet.

If the data packet misses the cache, it may be considered that the data packet is not a repeated packet. In this case, the data packet may be processed according to a normal procedure: calculating a routing policy for the data packet and then delivering a flow entry to the OFS on a path, so that the OFS transmits the data packet according to the delivered flow entry; and a key value of the data packet is stored.

Optionally, as an embodiment, the key value further includes a processing moment, and the memory 605 may further store an instruction that enables the processor 604 to execute the following operations:

comparing a feature value of the data packet with the data packet feature value in the key value, to determine whether the data packet hits the cache; if the data packet hits the cache, determining whether a time interval between a current moment and the processing moment in the key value is less than or equal to a preset time value, where the preset time value is a time value less than or equal to a flow table valid time; and if the time interval is less than or equal to the preset time value, determining that the data packet is a repeated packet; or if the data packet misses the cache, or the time interval is greater than the preset time value, determining that the data packet is not a repeated packet.

If that the data packet hits the cache and that the time interval is less than or equal to the preset time value are not satisfied at the same time, it may be determined that the data packet is not a repeated packet, the data packet may be processed according to a normal procedure, and a key value of the data packet may be stored in the cache.

In this way, a network error caused by setting no time limit or setting a large time value can be prevented, and performance of the SDN network can be further improved.

Optionally, as an embodiment, the key value further includes a processing moment and a counter value, and the memory 605 may further store an instruction that enables the processor 604 to execute the following operations:

comparing a feature value of the data packet with the data packet feature value in the key value, to determine whether the data packet hits the cache; if the data packet hits the cache, determining whether a time interval between a current moment and the processing moment in the key value is less than or equal to a preset time value, and determining whether the counter value in the key value is zero, where the preset time value is a time value less than or equal to a flow table valid time; and if the time interval is less than or equal to the preset time value, and the counter value is not zero, determining that the data packet is a repeated packet, and subtracting one from the counter value in the key value; or if the data packet misses the cache, or the time interval is greater than the preset time value, or the counter value is zero, determining that the data packet is not a repeated packet.

An initial value is preset for a counter, and after the OFC determines that the data packet is a repeated packet, one is subtracted from the counter value. If that the data packet hits the cache, that the time interval is less than or equal to the preset time value, and that the counter value is not zero are not satisfied at the same time, the OFC may determine that the data packet is not a repeated packet, process the data packet according to a normal procedure, and store a key value of the data packet in the cache. If the counter value is zero, the counter is reset to the initial value.

In this way, a network error caused by setting no time limit or setting a large time value can be prevented, and performance of the SDN network can be further improved. For example, in a process in which the OFC delivers a flow entry to the OFS, an accidental error, a communication error, a check error, a validation error, or the like occurs, and consequently, the flow entry does not take effect.

In addition, when a network error occurs, the OFC may constantly determine that a data packet is a repeated packet, and instruct the OFS to match a flow entry to perform transmission. However, the OFS cannot find a matched flow entry all the time, and reports the data packet to the OFC, causing a transmission storm. A counter constraint condition is added, and according to the foregoing processing procedure, when a quantity of times that the OFC constantly delivers a data packet exceeds the initial counter value, the OFC recalculates a routing policy, so as to avoid or ease the foregoing transmission storm.

Optionally, as an embodiment, the cache is a cache, of a fixed size, maintained based on a least recently used LRU algorithm.

In this way, when a cache capacity is insufficient, a least recently used key value can be automatically deleted, so as to implement self-management.

Optionally, as an embodiment, the memory 605 may further store an instruction that enables the processor 604 to execute the following operations:

when it is determined, according to the key value stored in the cache, whether the data packet is a repeated packet, a multithreaded allocator of the OpenFlow controller 60 may allocate a thread according to the feature value of the data packet, so that the OFC determines, in the thread according to the key value stored in the cache, whether the data packet is a repeated packet.

In this way, the OFC may roughly allocate, according to the feature value of the data packet, similar data packets to a same thread for processing, so as to avoid a problem that different threads process similar data packets but cannot recognize a repeated packet, thereby further improving processing efficiency of a repeated packet and reducing a calculation amount of the OFC.

Optionally, as an embodiment, the feature value includes one or more of a source Media Access Control MAC address, a destination MAC address, a source Internet Protocol IP address, a destination IP address, a source port number, a destination port number, or a virtual local area network VLAN identifier and priority.

Optionally, as an embodiment, the preset time value is a time value determined according to a time during which the OFS responds to a message delivered by the OFC.

Optionally, as an embodiment, the memory 605 may further store an instruction that enables the processor 604 to execute the following operations:

if the data packet is not a repeated packet, after the routing policy for the data packet is calculated, storing a key value of the data packet in the cache.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps can be implemented by electronic hardware, computer software, or a combination thereof. To clearly describe interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A routing control method performed by an OpenFlow controller (OFC) in software defined networking, the method comprising:

receiving a first data packet reported by an OpenFlow switch (OFS);

comparing a feature value of the first data packet with a data packet feature value in a key value stored in the OFC, wherein the key value comprises the data packet feature value and a processing moment value;

determining that the feature value of the first data packet is the same as the data packet feature value in the key value;

determining a time interval between a current moment and the processing moment value in the key value is less than or equal to a preset time value, wherein the preset time value is a time value less than or equal to a flow table valid time; and instructing the OFS to match a stored flow table to process the first data packet.

2. The method according to claim 1, wherein the key value further comprises a counter value; and further comprising:
  determining the counter value is not zero, and
  subtracting one from the counter value in the key value.
3. The method according to claim 2, further comprising:
  receiving a second data packet reported by the OFS, wherein the second data packet is a repeated data packet of the first data packet;
  determining the counter value is zero;
  calculating a routing policy; and
  delivering a flow table to the OFS according to the routing policy.
4. The method according to claim 1, wherein the preset time value is a time value determined according to a time during which the OFS responds to a message delivered by the OFC.
5. The method according to claim 1, wherein the data packet feature value comprises one or more of a source Media Access Control (MAC) address, a destination MAC address, a source Internet Protocol (IP) address, a destination IP address, a source port number, a destination port number, or a virtual local area network (VLAN) identifier and priority.
6. The method according to claim 1, further comprising:
  allocating a thread according to the data packet feature value in the key value, wherein the thread is configured to determine whether the first data packet is the repeated packet.
7. The method according to claim 1, further comprising:
  storing the key value in a cache when receiving a non-repeated data packet, wherein the first data packet is a repeated data packet of the non-repeated data packet.
8. An OpenFlow controller, comprising:
  a processor;
  a cache; and
  a memory configured to store one or more execution instructions and coupled to the processor, wherein the processor is configured to invoke the execution instruction in the memory causing the OpenFlow controller to:
  receive a first data packet reported by an OpenFlow switch (OFS),
  compare a feature value of the first data packet with a data packet feature value in the key value, wherein the key value comprises the data packet feature value and a processing moment value,
  determine that the feature value of the first data packet is the same as the data packet feature value in the key value,
  determine a time interval between a current moment and the processing moment value in the key value is less than or equal to a preset time value, wherein the preset time value is a time value less than or equal to a flow table valid time, and
  instruct the OFS to match a stored flow table to process the first data packet.
9. The controller according to claim 8, wherein:
  the key value further comprises a counter value; and
  the processor is further configured to invoke the execution instruction in the memory causing the OpenFlow controller to:
  determine the counter value is not zero, and
  subtract one from the counter value in the key value.
10. The controller according to claim 9, wherein the processor is further configured to invoke the execution instruction in the memory causing the OpenFlow controller to:
  receive a second data packet reported by the OFS, wherein the second data packet is a repeated data packet of the first data packet;
  determine the counter value is zero;
  calculate a routing policy; and
  deliver a flow table to the OFS according to the routing policy.
11. The controller according to claim 8, wherein the preset time value is a time value determined according to a time during which the OFS responds to a message delivered by the OFC.
12. The controller according to claim 8, wherein the data packet feature value comprises one or more of a source Media Access Control (MAC) address, a destination MAC address, a source Internet Protocol (IP) address, a destination IP address, a source port number, a destination port number, or a virtual local area network (VLAN) identifier and priority.
13. The controller according to claim 8, wherein the processor is further configured to invoke the execution instruction in the memory causing the OpenFlow controller to:
  allocate a thread according to the data packet feature value in the key value, wherein the thread is configured to determine whether the first data packet is the repeated packet.
14. The controller according to claim 8, wherein the processor is further configured to invoke the execution instruction in the memory causing the OpenFlow controller to:
  store the key value in the cache when receiving a non-repeated packet, wherein the first data packet is a repeated data packet of the non-repeated data packet.

* * * * *